United States Patent [19]

Zomick

[11] Patent Number: 4,786,172

[45] Date of Patent: Nov. 22, 1988

[54] FIBER-OPTIC ANGULAR RATES SENSOR HAVING ENHANCED RELIABILITY

[75] Inventor: David A. Zomick, Teaneck, N.J.

[73] Assignee: Allied-Signal Inc., Morris Township, Morris County, N.J.

[21] Appl. No.: 18,362

[22] Filed: Feb. 24, 1987

[51] Int. Cl.$^4$ .................... G01B 9/02; G01C 19/64
[52] U.S. Cl. ............................................ 356/350
[58] Field of Search ............................... 356/350

[56] References Cited

U.S. PATENT DOCUMENTS 4,444,503  4/1984  Schiffner ....................... 356/350

Primary Examiner—Vincent P. McGraw
Attorney, Agent, or Firm—Howard G. Massung

[57] ABSTRACT

A fiber-optic angular rate sensor having enhanced reliability is disclosed, wherein counter-propagating light beams are directed through a multi-turn fiber-optic coil. The light beams are phase shifted relative to each other as the coil rotates to produce a phase difference which is detected to provide a measurement of the rotational rate of the coil. A redundant light source and detector arrangement are included to enhance the reliability of the device and to insure a reciprocal device without sacrificing accuracy.

12 Claims, 1 Drawing Sheet

FIBER-OPTIC ANGULAR RATES SENSOR HAVING ENHANCED RELIABILITY

BACKGROUND OF THE INVENTION

Fiber-optic angular rate sensors, i.e. gyroscopes, are now being implemented to replace mechanical angular rate sensors used for guidance, control and navigation purposes. Fiber-optic devices turn on instantly, have long shelf life and are virtually maintenance free. As "strap-down" devices they do not require expensive gimballed mounting systems and are not encumbered by low rotational-rate lock-in that causes other optical angular rate sensors to provide inaccurate outputs at low angular rates.

The fiber-optic angular rate sensor exploits George Sagnac's concept of exciting an interferometer from an external optical source and directly measuring the phase shift of two counterpropagating light beams after they traverse a closed path. In the case of a fiber-optic device the path is a glass fiber instead of Sagnac's original free space, and the effective sensitivity of the device can be enhanced by using multiple turns of fiber in a coil arrangement.

Basic fiber-optic angular rate sensors use a beam from a single optical source and divide the beam into two beams. The two beams are directed in opposite directions (counterpropagated) through a multi-turn fiber-optic coil. Rotation of the coil produces Sagnac phase shifts in each beam that are equal in magnitude but opposite in sign. The phase difference between the two optical beams is linearly proportional to the rotational rate of the coil. Most configurations use a phase modulator (or frequency shifter) to increase the sensitivity of the device for small angle rotations and to reduce noise by measuring the phase at the modulation frequency.

The principals of the above described technology are described in an article entitled *Fiber Optic Gyroscopes* by B. Y. Kim and H. J. Shaw published in the March 1986 issue of "IEEE Spectrum", pages 54–60, the same being incorporated herein by reference.

One of the primary motivations for using fiber-optic angular rate sensors is their lack of mechanical parts and wearout mechanisms and hence their potential as a long-life sensor. This is important where reliability is critical, such as in long space missions. The primary present limitation on the life of these devices is the life of the light source. This is especially true in the case where superluminescent diodes are used as the light source.

Accordingly, it is the object of the present invention to increase the expected life of a fiber-optic angular rate sensor by introducing a redundant light source and detector arrangement into a basic angular rate sensor configuration.

SUMMARY OF THE INVENTION

This invention contemplates a fiber-optic angular rate sensor in a redundant light source and detector configuration for enhancing the reliability of the device. The redundant light source is coupled to a "dead" port of the second of two light beam couplers. The second coupler is needed in high performance sensors to insure a reciprocal configuration, i.e. to insure that the counterpropagating light beams traverse optical paths which are nearly identical. A redundant configuration as described is advantageous in that: it does not require a duplicate sensing coil, which for high performance sensors requiring long lengths of polarization maintaining fiber is an expensive component; it does not require a redundant modulator; and it does not result in performance degradation of the basic angular rate sensor.

DETAILED DESCRIPTION OF THE INVENTION

Figure 1:
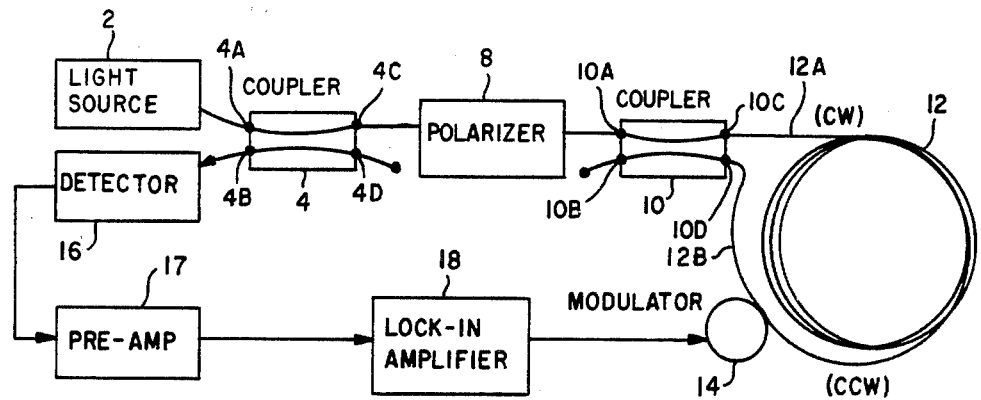
FIG. 1 is a schematic representation illustrating a basic prior art fiber-optic angular rate sensor configuration.

With reference to FIG. 1, a light source is designated by the numeral 2. Light source 2 may be a laser or a superluminescent diode which generates a light beam. A coupler 4, a polarizer 8 and a coupler 10 are sequentially coupled through one end 12A of a multi-turn fiber-optic coil 12 so that the light beam from light source 2 is transmitted through coupler 4, polarizer 8, coupler 10 and coil 12.

Coupler 4 has four ports, i.e., ports 4A, 4B, 4C and a "dead" port 4D. The light beam from light source 2 is transmitted to coupler 4 through port 4A and is transmitted from the coupler through port 4C and "dead" port 4D. Coupler 4 may be a fused tapered fiber coupler, a polished block coupler or an integrated optic circuit. In any event, the coupler is a directional coupler and is a guided-wave equivalent of the well-known half-silver mirror or beam splitter which splits one optical into two beams or combines two beams into one beam. The structural details of a coupler of the type contemplated are described in the article *Fiber Optic Gyroscopes*, Supra.

The light beam transmitted through coupler port 4C is transmitted to polarizer 8. In connection with polarizer 8, it will be understood that the polarizer is, in effect, a filter and is only required in higher performance applications in which high birefringent, polarization maintaining fiber is utilized. The structural details of a polarizer of the type contemplated are described in the article *Fiber Optic Gyroscopes*, Supra.

Coupler 10 is similar to coupler 4 and has four ports, i.e., ports 10A, 10C, 10D and a "dead" port 10B. A polarized or filtered light beam from polarizer 8 is transmitted to port 10A of coupler 10. Coupler 10 splits the light beam into two counterpropagating light beams which travel around multi-turn fiber-optic coil 12 coupled at end 12A to port 10C and coupled at an opposite end 12B to port 10D. Thus, one light beam travels around coil 12 in a clockwise (cw) direction, and the other light beam travels around coil 12 in a counterclockwise (ccw) direction as indicated in FIG. 1.

As coil 12 rotates as part of a guidance, control or navigation system, the counterpropagating light beams are phase shifted with respect to each other. This differential phase shift is commonly referred to as the Sagnac relativistic phase shift.

A phase modulator 14 is disposed at end 12B of coil 12 and causes a time varying modulation of the differential phase shift between the two counterpropagating beams. Modulator 14 may be a mechanical oscillator (e.g., a PZT ring) or an integrated optic phase shifter, as is well known in the art.

The counterpropagating light beams travelling around coil 12 are transmitted to coupler 10 via ports 10C and 10D, whereby light beams are provided at coupler ports 10A and 10B. The light beam at port 10A is transmitted to polarizer 8, and the polarized and filtered light beam from polarizer 8 is transmitted to coupler 4 via port 4C, and is finally transmitted from coupler port 4B to detector 6. Detector 16 provides an electrical (AC) signal which is applied to a pre-amp 17 and therefrom to a phase sensitive demodulator such as a lock-in amplifier 18, which measures the electrical signal from detector 16 at the phase modulation frequency of modulator 14. In the configuration shown, modulator 4 acts as a frequency shifter and increases the sensitivity of the device for small angular rotations and achieves noise reduction by detecting at the phase modulation frequency.

With the arrangement shown and described in FIG. 1 a disadvantage exists in that the life of light source 2 is limited and hence the life of the angular rate sensor is limited. This is particularly the case when the light source is a superluminescent diode. The present invention mitigates this disadvantage as will be next described with reference to FIG. 2.

Figure 2:
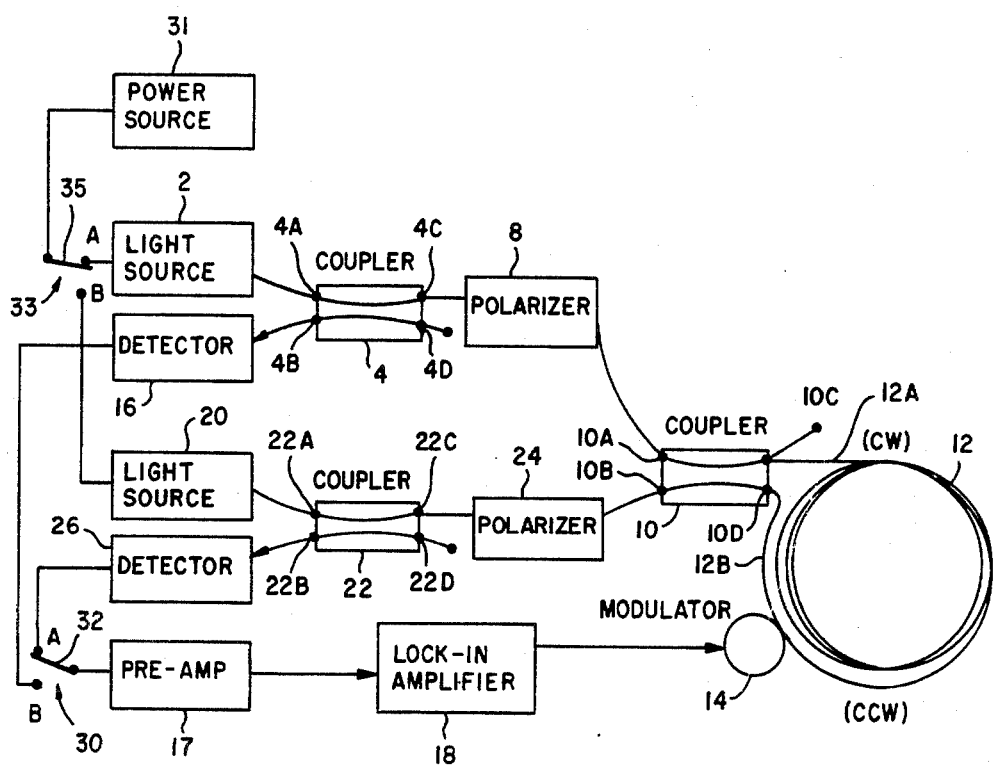
FIG. 2 is a schematic representation illustrating a fiber-optic angular rate sensor configuration in accordance with the invention.

Thus, FIG. 2 shows a configuration including a redundant light source 20 similar to light source 12, a redundant coupler 22 similar to couplers 4 and 10, a redundant polarizer 24 similar to polarizer 8 and a redundant detector 26 similar to detector 16. Detectors 16 and 26 are selectively connected to pre-amp 17 through a switching means 30 which may be programmably operated as by means known to those skilled in the art. Light sources 2 and 20 are selectively actuated via power source 31 and switching means 33 which may also be programmably operated as by means known to those skilled in the art. Thus, light source 2 is activated when arm 35 of switch 33 is in position A as shown, and light source 20 is activated when the switch arm is in position B.

It will be seen that the aforenoted redundant components are connected to previously "dead" port 10B of coupler 10. Thus, light source 20, coupler 22 and polarizer 24 are sequentially coupled to end 12B of multi-turn fiber-optic coil 12 so that the light beam from light source 20 is transmitted through coupler 22, polarizer 24, coupler 10 and coil 12 in a counterpropagating manner similar to that described with reference to FIG. 1.

When arm 32 of switch 30 is in position A as shown in FIG. 2, the signal from detector 26 is applied through switching means 30 to pre-amp 17 and therefrom to lock-in amplifier 18 and modulator 14. When switch arm 32 is in position B, the signal from detector 16 is applied to the pre-amp, lock-in amplifier and modulator as will now be understood.

The embodiment of the invention shown in FIG. 2, wherein a redundant light transmitting channel is provided, is advantageous in that a duplicate multi-turn coil is not required. This is important for high performance angular rate sensors using long lengths of polarization maintaining fiber in the coil, as this is the most expensive component of the device. Moreover, the redundant configuration does not require a duplicate modulator 14. It should be understood, however, that the configuration allows for insertion of an additional modulator at opposite end 12A of multi-turn fiber-optic coil 12 for further reliability enhancement as may be desired.

The redundant configuration of FIG. 2 does not result in any performance degradation relative to the basic system shown in FIG. 1. In this regard it is noted that in FIG. 1, two couplers 4 and 10 are required to insure a device having complete reciprocity, that is to say, a device wherein the counterpropagating light beams follow identical paths. It will be understood that this configuration, in itself, results in an automatic loss of one half the power each time light passes through couplers 4 and 10. Hence, in the basic configuration shown in FIG. 1, only one-eighth of the source power reaches detector 16, even for a perfectly lossless arrangement.

Thus, the redundant configuration shown in FIG. 2 utilizes the "dead" or previously unused port of coupler 10 as a coupling point for a redundant light beam transmitting channel including light source 20, coupler 22, polarizer 24 and detector 26, and maintains optimum output for a reciprocal fiber-optic angular rate sensor arrangement.

It will be further understood that it is not necessary to introduce redundant sensing electronics unless such redundancy is desirable for further reliability or accuracy. Hence, switching means 30 is configured to connect the output of either detector 16 or detector 26 to the sensing electronics including pre-amp 17 and lock-in amplifier 18.

In the arrangement shown in FIG. 2, one of the detectors 16 or 26 can be used to monitor the operation of the other light beam transmitting channel to identify significant changes in light source output or channel optical power loss, as the case may be. It is further possible, with the configuration shown in FIG. 2, to utilize the device if a light source in one channel fails and a detector in the other channel fails. However, in this eventuality, some performance degradation is expected since the light paths will not be strictly reciprocal, that is to say, the clockwise light beam will not have undergone a coupler transition while the counter-clockwise light beam will have undergone two such transitions and the source and detector polarizers will no longer be the same polarizer.

Finally, the configuration shown in FIG. 2 is to be considered optimum in the sense that it is not possible to add additional light sources beyond the proposed two in a straight-foward all-fiber system. It would be possible to add more such sources with bulk optic modules and mechanical switching devices but these would likely detract, more than add, to the reliability of the device, and hence are not advantageous.

With the above description of the invention in mind reference is made to the claims appended hereto for a description of the scope of the invention.

What is claimed is:

1. A fiber-optic angular rate sensor, characterized by:
   a first light source for providing a first light beam;
   a second redundant light source for providing a second light beam;
   a rotatable multi-turn fiber-optic coil;
   a first light beam transmitting channel coupled to the first light source and to the coil;
   a second redundant light beam transmitting channel coupled to the second redundant light source and to the coil;
   switching means for selectively actuating one of the first and second light sources, with the corresponding one of the first and second channels being responsive to the light beam from the one light source for transmitting two counterpropagating light beams around the coil so that upon rotation of the coil the counterpropagating light beams are phase shifted with respect to each other, with a resulting phase difference between the beams being proportional to the rotational rate of the coil;

a first detector connected to the first channel and a second redundant detector connected to the second channel, said first and second detectors detecting the counterpropagating light beams transmitted by the corresponding first and second channels and providing electrical signals;

means for measuring the electrical signals commensurate with the phase difference between the counterpropagating light beams; and switching means for selectively connecting the measuring means to a corresponding one of the first and second detectors so that said measuring means measures the electrical signal provided by the one detector.

2. A fiber-optic angular rate sensor as described by claim 1, wherein the first light beam transmitting channel is characterized by:

a first coupler, a first polarizer and a second coupler sequentially coupled through one end of the fiber-optic coil; and an opposite end of the fiber-optic coil coupled to the second coupler.

3. A fiber-optic angular rate sensor as described by claim 2, further characterized by:

the first detector connected to the first coupler and connected to the means for selectively connecting the measuring means to one of the first and second detectors.

4. A fiber-optic angular rate sensor as described by claim 2, wherein the second redundant light beam transmitting channel is characterized by:

a third coupler, a second polarizer and the second coupler sequentially coupled through an opposite end of the fiber-optic coil; and the one end of the fiber optic coil coupled to the second coupler.

5. A fiber-optic angular rate sensor as described by claim 4, further characterized by:

the second redundant detector connected to the third coupler and connected to the switching means for selectively connecting the measuring means to one of the first and second detectors.

6. A fiber-optic angular rate sensor as described by claim 1, wherein the measuring means is characterized by:

amplifier means connected to the switching means for selectively connecting the measuring means to a corresponding one of the first and second detectors for providing an amplified detected signal;

a phase sensitive demodulator connected to the amplifier means for measuring the amplified detected signal at a phase modulation frequency; and at least one phase modulator connected to the demodulator for receiving the signal at a phase modulation frequency therefrom, and coupled to the fiber-optic coil for providing a time varying modulation of the phase difference between the two counterpropagating beams.

7. For a fiber-optic angular rate sensor of the type including a light source for providing a light beam, a rotatable multi-turn fiber-optic coil, a light beam transmitting channel connected to the light source and to the coil, a detector connected to the light beam transmitting channel for detecting two counterpropagating light beams transmitted thereby and for providing a corresponding electrical signal, and means for measuring the electrical signal commensurate with a phase different between the counterpropagating light beams, the improvement characterized by:

a second redundant light source for providing a second light beam;

a second redundant light beam transmitting channel coupled to the second light source and to the coil;

switching means for selectively actuating one of the first and second light sources, with a corresponding one of the first and second channels being responsive to the light beam from the one light source for transmitting two counterpropagating light beams around the coil so that upon rotation of the coil the counterpropagating light beams are phase shifted with respect to each other, with a resulting phase difference between the beams being proportional to the rotational rate of the coil;

a second redundant detector connected to the second channel for detecting two counterpropagating light beams transmitted by the second channel for providing a corresponding second electrical signal;

the means for measuring the first mentioned electrical signal measuring the second electrical signal; and switching means for selectively connecting the measuring means to one of the detectors so that said measuring means measures the electrical signals provided by the one detector.

8. A fiber-optic angular rate sensor as described by claim 7, wherein the first light beam transmitting channel is characterized by:

a first coupler, a first polarizer and a second coupler sequentially coupled through one end of the fiber-optic coil; and an opposite end of the fiber-optic coil coupled to the second coupler.

9. A fiber-optic angular rate sensor as described by claim 8, further characterized by:

the first detector connected to the first coupler and connected to the switching means for selectively connecting the measuring means to one of the detectors.

10. A fiber-optic angular rate sensor as described by claim 8, wherein the second redundant light beam transmitting channel is characterized by:

a third coupler, a second polarizer and the second coupler sequentially coupled through an opposite end of the fiber-optic coil; and the one end of the fiber-optic coil coupled to the second coupler.

11. A fiber-optic angular rate sensor as described by claim 4, further characterized by:

the second detector connected to the third coupler and connected to the switching means for selectively connecting the measuring means to one of the detectors.

12. A fiber-optic angular rate sensor as described by claim 7, wherein the measuring means is characterized by:

amplifier means connected to the switching means for selectively connecting the measuring means to a corresponding one of the detectors for providing an amplified detected signal;

a phase sensitive demodulator connected to the amplifier means for measuring the amplified detected signal at a phase modulation frequency; and at least one phase modulator connected to the demodulator for receiving the signal at a phase modulation frequency therefrom, and coupled to the fiber-optic coil for providing a time varying modulation of the phase difference between the two counterpropagating beams.

* * * * *